(12) United States Patent
Kashiwabara et al.

(10) Patent No.: US 11,927,225 B2
(45) Date of Patent: Mar. 12, 2024

(54) SLIDING SPLINE SHAFT DEVICE

(71) Applicants: NISSAN MOTOR CO., LTD., Yokohama (JP); NIHON PARKERIZING CO., LTD., Tokyo (JP)

(72) Inventors: Shigetoshi Kashiwabara, Kanagawa (JP); Kunio Katada, Kanagawa (JP); Shunsuke Hiraiwa, Kanagawa (JP); Akihumi Kawaguchi, Kanagawa (JP); Takeo Nishijima, Kanagawa (JP); Shinichi Suzuki, Kanagawa (JP); Yasuyuki Katsumada, Kanagawa (JP); Makoto Nakajima, Kanagawa (JP); Tokunori Kodama, Kanagawa (JP); Masato Ito, Kanagawa (JP); Aiki Iwasa, Kanagawa (JP)

(73) Assignees: NISSAN MOTOR CO., LTD., Yokohama (JP); NIHON PARKERIZING CO., LTD., Tokyo (JP)

( * ) Notice: Subject to any disclaimer, the term of this patent is extended or adjusted under 35 U.S.C. 154(b) by 702 days.

(21) Appl. No.: 17/056,471

(22) PCT Filed: Apr. 12, 2019

(86) PCT No.: PCT/JP2019/015959
§ 371 (c)(1),
(2) Date: Nov. 18, 2020

(87) PCT Pub. No.: WO2019/225203
PCT Pub. Date: Nov. 28, 2019

(65) Prior Publication Data
US 2021/0199158 A1      Jul. 1, 2021

(30) Foreign Application Priority Data

May 23, 2018   (JP) ................................. 2018-098939

(51) Int. Cl.
*F16D 3/06*    (2006.01)
*C09D 7/61*    (2018.01)
(Continued)

(52) U.S. Cl.
CPC .................. *F16D 3/06* (2013.01); *C09D 7/61* (2018.01); *C09D 179/08* (2013.01);
(Continued)

(58) Field of Classification Search
CPC ............... F16D 3/06; F16D 2200/0021; F16D 2200/0034; F16D 2200/0052;
(Continued)

(56) References Cited

U.S. PATENT DOCUMENTS 2,214,104 A  *  9/1940  Hildabolt ................ B22F 7/002
6,123,009 A  *  9/2000  Kanayama ............ F16H 57/041
(Continued)

FOREIGN PATENT DOCUMENTS

CN    102537103 A    7/2012
EP    1 548 265 A1   6/2005
(Continued)

*Primary Examiner* — Greg Binda
(74) *Attorney, Agent, or Firm* — Foley & Lardner LLP

(57) ABSTRACT

A sliding spline shaft device of the present invention includes a male spline and a female spline that is fitted to the male spline in an axially slidable manner, and at least one of the splines has a surface processed layer. The surface processed layer includes an undercoat layer, an intermediate layer containing phosphate, and a topcoat layer containing solid lubricant, in this order. The undercoat layer contains iron nitride and/or iron carbide. Thus, the surface of a base material has high hardness. As a result, microscopic deformation of the sliding surface is reduced, and increase in a real contact area is suppressed, whereby stick-slip is prevented.

16 Claims, 8 Drawing Sheets

(51) Int. Cl.
*C09D 179/08* (2006.01)
*C10M 103/06* (2006.01)
*C10M 107/44* (2006.01)
*C10M 111/04* (2006.01)
*C22C 38/02* (2006.01)
*C22C 38/04* (2006.01)
*C23C 28/04* (2006.01)
*C10N 50/00* (2006.01)

(52) U.S. Cl.
CPC ........ *C10M 103/06* (2013.01); *C10M 107/44* (2013.01); *C10M 111/04* (2013.01); *C22C 38/02* (2013.01); *C22C 38/04* (2013.01); *C23C 28/04* (2013.01); *C10M 2201/0663* (2013.01); *C10M 2217/0245* (2013.01); *C10N 2050/023* (2020.05); *F16D 2200/0021* (2013.01); *F16D 2200/0034* (2013.01); *F16D 2200/0052* (2013.01); *F16D 2300/06* (2013.01); *F16D 2300/10* (2013.01)

(58) Field of Classification Search
CPC ... F16D 2300/06; F16D 2300/10; C09D 7/61; C09D 179/08; C10M 103/06; C10M 107/44; C10M 111/04; C10M 2201/0663; C10M 2217/0245; C22C 38/02; C22C 38/04; C23C 28/04; C10N 2050/023

USPC ........................................ 464/9, 16; 508/141
See application file for complete search history.

(56) References Cited

U.S. PATENT DOCUMENTS

| | | | |
|---|---|---|---|
| 6,982,120 B2* | 1/2006 | Schuster | .................. C21D 9/40 |
| 7,963,852 B2* | 6/2011 | Ando | ..................... B60K 17/22 |
| | | | 464/9 |
| 2019/0003620 A1 | 1/2019 | Goto et al. | |

FOREIGN PATENT DOCUMENTS

| | | |
|---|---|---|
| EP | 2 762 552 A1 | 8/2014 |
| JP | 4-36458 A | 2/1992 |
| JP | 2004-360707 A | 12/2004 |
| JP | 2008-19916 A | 1/2008 |
| JP | 2010-111906 A | 5/2010 |
| JP | 2011-235317 A | 11/2011 |
| JP | 2013-189569 A | 9/2013 |
| JP | 2016-196922 A | 11/2016 |
| WO | WO 2014/061655 A1 | 4/2014 |
| WO | WO-2017/110685 A1 | 6/2017 |

* cited by examiner

SLIDING SPLINE SHAFT DEVICE

TECHNICAL FIELD

The present invention relates to a sliding spline shaft device, and more specifically relates to a sliding spline shaft device unlikely to cause stick-slip.

BACKGROUND ART

A propeller shaft transmits output of an automobile engine to driving wheels. A propeller shaft is, for example, coupled to a transmission at one end and is also coupled to a differential gear at the other end, to transmit engine output to driving wheels.

In general, an engine and a differential gear are suspended to a vehicle body by elastic bodies, such as springs, and a distance between the engine and the differential gear varies due to acceleration and deceleration of an automobile. In view of this, the propeller shaft is provided with a sliding spline shaft device for absorbing the variation in the distance by sliding in an axial direction.

This sliding spline shaft device is required to smoothly slide in the axial direction and thus has a sliding surface that generates low friction force.

However, in the condition in which a dynamic friction force of the sliding surface is low, fast sliding occurs at the moment when stress acting on the sliding surface exceeds a static friction force, and the sliding ceases when the stress becomes low. As a result, the static friction force and the dynamic friction force alternately appear, that is, the so-called "stick-slip" occurs.

Japanese Unexamined Patent Application Publication No. 2013-189569 of Patent Document 1 discloses providing a coating film that contains solid lubricant, to suppress increase in static friction coefficient as well as suppress decrease in dynamic friction coefficient, whereby stick-slip is reduced.

CITATION LIST

Patent Document

Patent Document 1: JP2013-189569A

SUMMARY OF INVENTION

Technical Problem

However, when torque acting on the sliding spline shaft device increases, the static friction force increases, whereby the difference between the static friction force and the dynamic friction force increases, resulting in generation of large vibration due to stick-slip.

The present invention has been made in view of such a problem of conventional art, and an object of the present invention is to provide a sliding spline shaft device that suppresses generation of vibration due to stick-slip even when a large torque is applied.

Solution to Problem

The inventors of the present invention have made an intensive research to achieve the above object and have found the following findings. That is, the above object can be achieved by increasing hardness of a surface of a base material to reduce microscopic deformation of a sliding surface and thereby suppressing increase in real contact area. Thus, the present invention has been completed.

Specifically, a sliding spline shaft device for an automobile of the present invention includes a male spline and a female spline that is fitted to the male spline in an axially slidable manner, and at least one of the splines has a surface processed layer. The surface processed layer includes an undercoat layer, an intermediate layer containing phosphate, and a topcoat layer containing solid lubricant, in this order.

The undercoat layer includes a diffusion layer and a compound layer containing iron nitride.

The compound layer is porous.

Advantageous Effects of Invention

In the present invention, the surface hardness of the base material of the spline is increased to reduce microscopic deformation of the sliding surface. Thus, the present invention provides a sliding spline shaft device that is unlikely to cause stick-slip even when a large torque is applied.

DESCRIPTION OF EMBODIMENTS

Figure 1:
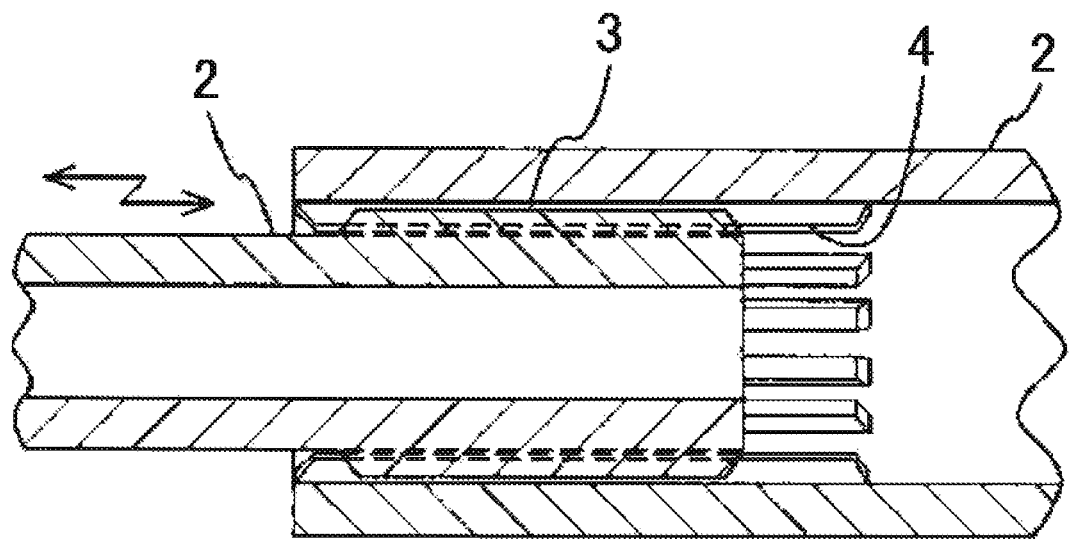
FIG. 1 is an axial direction cross-sectional view of a sliding spline shaft device.

A sliding spline shaft device 1 of the present invention will be described in detail. As illustrated in FIG. 1, the sliding spline shaft device 1 includes a male spline 3 and a female spline 4 that is fitted to the male spline 3 in an axially slidable manner, and at least one of the splines has a surface processed layer.

Figure 2:
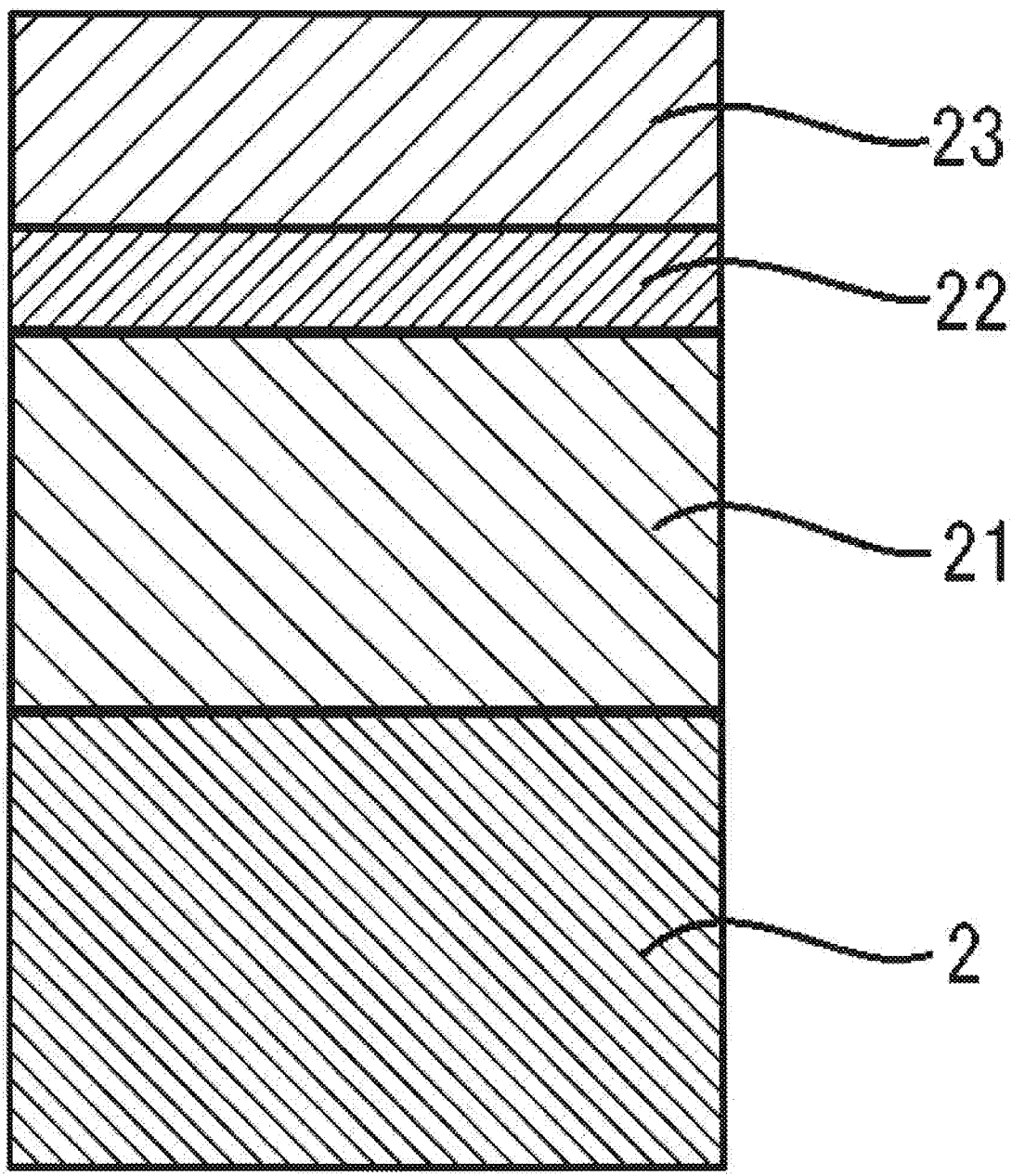
FIG. 2 is a cross-sectional view illustrating a layer structure of a surface processed layer.

As illustrated in FIG. 2, the surface layer includes an undercoat layer 21, an intermediate layer 22 containing phosphate, and a topcoat layer 23 containing solid lubricant, in this order, from a base material 2 side.

Undercoat Layer 21

The undercoat layer 21 contains iron nitride and/or iron carbide and hardens the surface of the base material 2.

The undercoat layer 21 preferably has Vickers hardness (HV) of 500 HV0.1 or greater. The undercoat layer 21, which has Vickers hardness of 500 HV0.1 or greater, suppresses microscopic deformation of the sliding surface and thereby prevents increase in static friction coefficient due to stress.

The upper limit of Vickers hardness (HV) is not specifically limited, but the practical upper limit of hardness is 900 HV0.1 or less in a case of hardening the base material 2 to be used in the sliding spline shaft device 1.

Note that Vickers hardness (HV) can be measured in accordance with JIS Z 2244. In addition, the numerical value that is suffixed to "HV" represents a load in measurement of Vickers hardness, in unit of kg. That is, "HV0.1" represents a measurement under a load of 0.1 kg.

The undercoat layer 21 can be formed by nitriding or carburizing, but is preferably formed by nitriding. An undercoat layer 21 that is formed by nitriding has high tempering resistance and is thereby not prone to cause decrease in surface hardness in forming the intermediate layer 22, which will be described later.

Examples of a method of the nitriding include a salt-bath nitrocarburizing method, a gas nitrocarburizing method, and an ion nitriding method. These nitriding treatments enable forming an undercoat layer 21 at a temperature of an A1 transformation point of the base material or less, whereby strain deformation of the base material 2 is suppressed.

The undercoat layer 21 that is formed by nitriding has a diffusion layer and a compound layer 211, in this order, from the base material 2 side. The diffusion layer is a layer, in which nitrogen is diffused in the base material 2. The compound layer 211 is columnar crystals containing $Fe_{2-3}N$ and $Fe_4N$.

Among them, a compound layer 211 that is formed by a salt-bath nitrocarburizing method is porous and improves peeling resistance of the intermediate layer 22 (described later) by an anchoring effect, more than a compound layer 211 that is formed by an ion nitriding method or a gas nitrocarburizing method. Moreover, this compound layer 211 is well lubricated with lubricating oil even when lubricating layers, e.g., the intermediate layer 22 and the topcoat layer 23, are worn out, and thus, this compound layer 211 improves wear resistance.

The thickness of the compound layer 211 is preferably 5 μm or greater and 15 μm or less. When the compound layer 211 is very thin, deformation of the sliding surface may not be sufficiently suppressed. When the compound layer 211 is very thick, the compound layer 211 is embrittled, and a static friction force may increase.

The diffusion layer is a layer in which nitrogen is diffused in a sorbite structure of the base material 2 to generate nitrides, such as Al—N, Cr—N, and Mo—N. The nitrides generate strain in the crystal lattice of Fe and hardens the surface of the base material 2.

The diffusion layer has high affinities with the base material 2 and the compound layer 211 and prevents peeling off of the compound layer 211 as well as improves fatigue strength of the base material 2.

In a case in which the surface hardness of the base material 2 is sufficiently high, it is not necessary to form the undercoat layer to each of the male spline 3 and the female spline 4, and the undercoat layer 21 may be formed only to the spline that has a base material 2 with a lower surface hardness.

Intermediate Layer 22

The intermediate layer 22 contains phosphate and improves wear resistance as well as adhesion of the topcoat layer 23, which will be described later.

The intermediate layer 22 can be formed by phosphating. Examples of the phosphating include a zinc phosphate treatment, a manganese phosphate treatment, and a calcium phosphate treatment. Among them, the manganese phosphate treatment is preferable for forming the intermediate layer 22.

A manganese phosphate crystal that is formed by a manganese phosphate treatment tends to be larger than crystals that are formed by other phosphate treatments, and the manganese phosphate crystal forms an intermediate layer 22 having a high maximum height (Ry). Thus, the manganese phosphate crystal improves peeling resistance of the topcoat layer 23 by an anchoring effect. The topcoat layer 23 will be described later.

Moreover, manganese phosphate makes the sliding surface smooth due to self-sacrificial wear and reduces surface pressure, thereby improving wear resistance.

The film thickness of the intermediate layer 22 is preferably 1 μm or greater and 5 μm or less.

When the film thickness is less than 1 μm, wear resistance may not be sufficiently improved. On the other hand, when the film thickness exceeds 5 μm, due to the intermediate layer 22 that is softer than the undercoat layer 21, a real contact area may increase to cause increase in static friction force when a large torque is applied to the sliding surface.

Topcoat Layer 23

The topcoat layer 23 contains solid lubricant and binder resin and reduces a dynamic friction force even when a large torque is applied to the sliding surface and breaks an oil film, and a mixed lubrication state or a boundary lubrication state occurs.

The solid lubricant may use inorganic fine particles or organic fine particles. Examples of the inorganic fine particles include inorganic fine particles of metal sulfides, e.g., molybdenum disulfide, graphite, carbon black, boron nitride, and metal oxides. On the other hand, examples of the organic fine particles include organic fine particles of fluororesin, polyolefin, and polyamide. These materials may be used alone or in combination.

Among them, the molybdenum disulfide particles and the graphene particles have lamellar structures in which thin pieces are laminated on one after another, and therefore, they have high load bearing performances and decrease a dynamic friction force by being dislocated in a certain direction when receiving a load. Thus, molybdenum disulfide particles and graphene particles are preferably used.

An average particle size (Fisher method) of the solid lubricant is preferably 0.3 μm or greater and 3 μm or less. In the condition in which the solid lubricant has particle sizes in the above range, a topcoat layer 23 with a thin film thickness can be formed.

The amount of the solid lubricant in the topcoat layer 23 is preferably 15 mass % or greater and 45 mass % or less.

Examples of the binder resin include polyamide-imide resin, polyphenylene sulfide resin, epoxy resin, phenol resin, and modified resins thereof. Among them, the polyamide-imide resin and the modified resin thereof have superior wear resistance and are thus preferably used.

The topcoat layer 23 can be formed, for example, by applying polyamic acid solution that contains solid lubricant, drying it to remove solvent, and performing imidization reaction.

Any solvent in which polyimide dissolves without generating a gel product and a precipitate, can be used as the solvent of the polyimide solution. For example, organic polar solvent, such as formamide solvent, acetamide solvent, and pyrrolidone solvent, may be used. These solvents may be used alone or several types of the solvents may be used as a mixed solvent.

The polyamic acid solution may further contain an additive, such as surface active agent or anti-settling additive. Surface active agent that is added, uniformly disperses the solid lubricant in the polyamic acid solution and maintains the dispersed state.

The film thickness of the topcoat layer 23 is preferably 1 μm or greater and 15 μm or less and more preferably 1 μm or greater and 9 μm or less.

When the film thickness is less than 1 μm, a dynamic friction force may not be sufficiently reduced. On the other hand, when the film thickness exceeds 15 μm, due to the topcoat layer 23 that is softer than the undercoat layer 21, a real contact area may increase to cause increase in static friction force when a large torque is applied to the sliding surface.

Moreover, an average of the total film thickness of the intermediate layer 22 and the topcoat layer 23 is preferably 20 μm or less, more preferably, 15 μm or less, and further preferably, 10 μm or less.

When the total film thickness of the intermediate layer 22 and the topcoat layer 23 is 20 μm or less, minute deformation of the sliding surface is suppressed in conjunction with the undercoat layer 21, whereby increase in static friction force is suppressed even when a large torque is applied to the sliding surface.

The film thicknesses of the topcoat layer 23, the intermediate layer 22, and the undercoat layer 21 can be measured by analyzing a cross-sectional SEM image of the surface processed layer.

In the present invention, a film thickness at an intermediate point on a waveform-shaped inclined surface of the spline is measured at ten positions, and the results are averaged to obtain an average film thickness.

Base Material 2

The base material 2 may use a steel material that is conventionally used for a sliding spline.

Specifically, it is possible to use a carbon steel containing 0.18 mass % or greater and 0.48 mass % or less of carbon (C), 0.15 mass % or greater and 0.35 mass % or less of silicon (Si), and 0.60 mass % or greater and 0.90 mass % or less of manganese (Mn).

EXAMPLES

The present invention will be detailed with reference to Examples hereinafter, but the present invention is not limited to Examples described below.

Example 1

(Formation of Undercoat Layer 21)

An S45C flat test piece (female spline, hardness: 260 HV0.1) and an Scr420H columnar test (male spline, 6 mm in diameter and 12 mm in height, hardness: 650 HV0.1) were degreased and washed by alkali solution and were dried, and they were preheated to approximately 350° C. and were then immersed in a molten salt bath at 570° C. for 90 minutes to be subjected to salt-bath nitrocarburizing (ISONITE (registered trademark) treatment, manufactured by Nihon Parkerizing Co., Ltd.).

Each of these test pieces was then taken out of the bath, cooled at a room temperature, and washed by water. Thus, an undercoat layer 21 including a compound layer 211 that had a film thickness of 9 μm, was formed.

The surface hardness (HV) of the S45C female spline 4 test piece was 650 HV0.1, and the surface hardness (HV) of the Scr420H male spline 3 test piece was 800 HV0.1.

(Formation of Intermediate Layer 22)

Each of the test pieces that were formed with the undercoat layer 21 was immersed in a manganese phosphate treatment liquid ("PALFOS M1A", manufactured by Nihon Parkerizing Co., Ltd.) at approximately 100° C. for 10 minutes, washed, and then dried, whereby an intermediate layer 22 with a film thickness of 2 μm was formed.

(Formation of Topcoat Layer 23)

Each of the test pieces that were formed with the intermediate layer 22 was coated with a molybdenum disulfide solid lubricant coating material ("Defric Coat", HMB-2H2, manufactured by Kawamura Research Lab., Inc.) by spraying and was dried at 180° C. for 30 minutes under nitrogen atmosphere, whereby solvent was removed.

Figure 3:
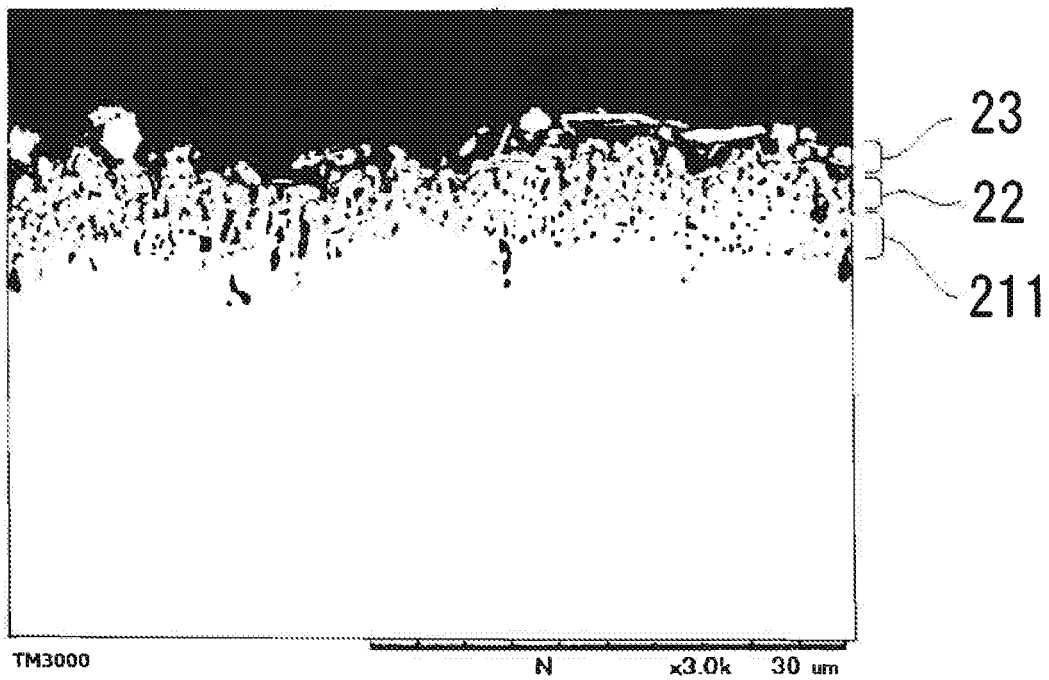
FIG. 3 illustrates a cross-sectional SEM image of a surface processed layer of Example 1.

Thereafter, each of the test pieces was heated at 250° C. for 2 hours, whereby polyamide-imide resin containing molybdenum disulfide formed a topcoat layer 23 having a thickness of 7 μm. Thus, test pieces of a sliding spline device 1 were prepared. A cross-sectional SEM image of the test piece is illustrated in FIG. 3.

Example 2

A test piece of the sliding spline device 1 was prepared in the same manner as in Example 1, except for forming a topcoat layer 23 having a film thickness of 13.5 μm.

Comparative Example 1

A test piece of the sliding spline device 1 was prepared in the same manner as in Example 2, except for not forming an undercoat layer 21.

Evaluation (Measurement of Sliding Force)

Static friction force and dynamic friction force were measured with respect to each varied load in the condition in which a reciprocation frequency of 3 Hz and an amplitude of 2.2 mm, by using a high-speed reciprocating friction test apparatus (PLINT TE77).

Figure 4:
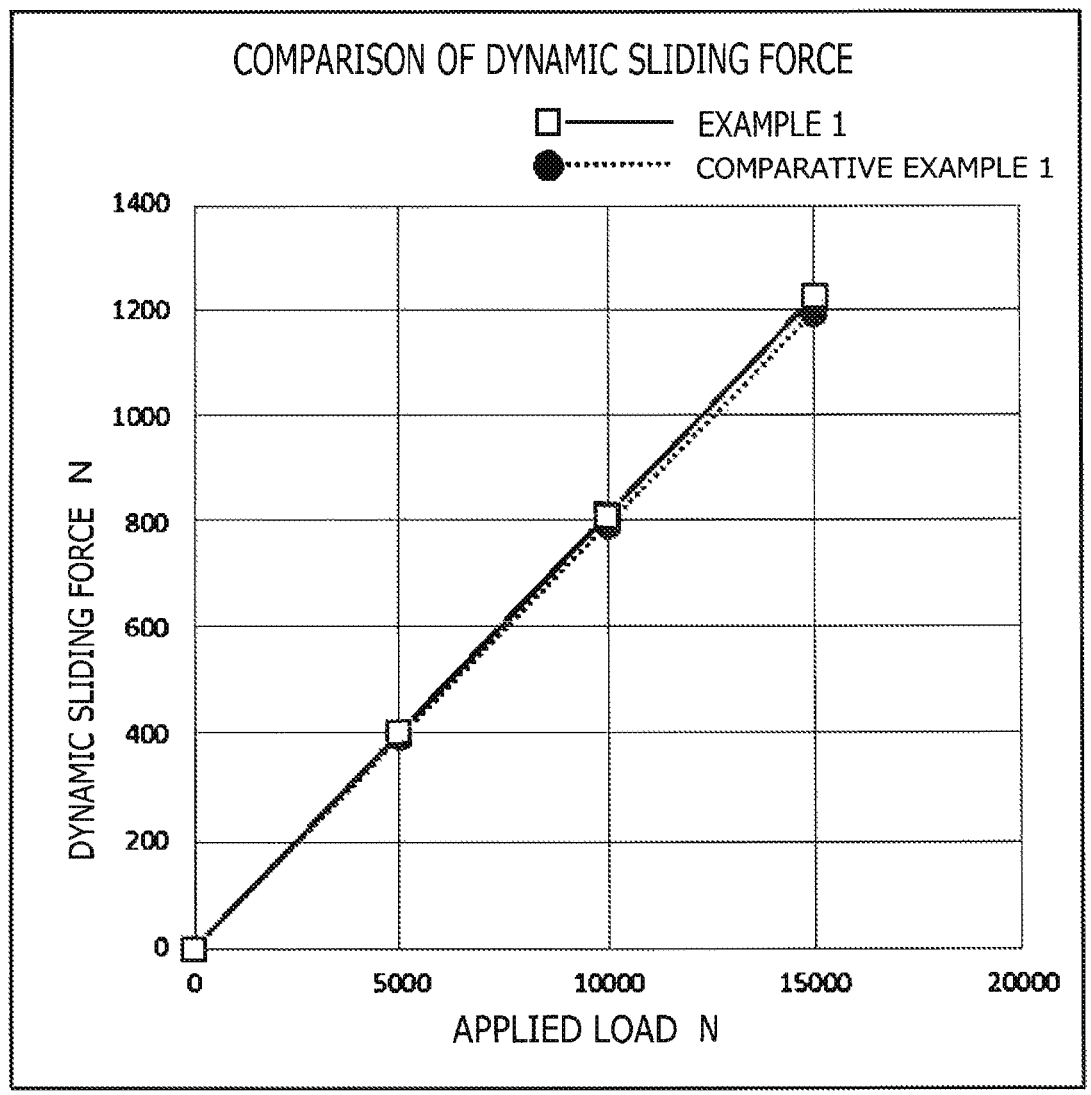
FIG. 4 is a graph illustrating variation in dynamic sliding force relative to an applied load of each of Example 1 and Comparative Example 1.
Figure 5:
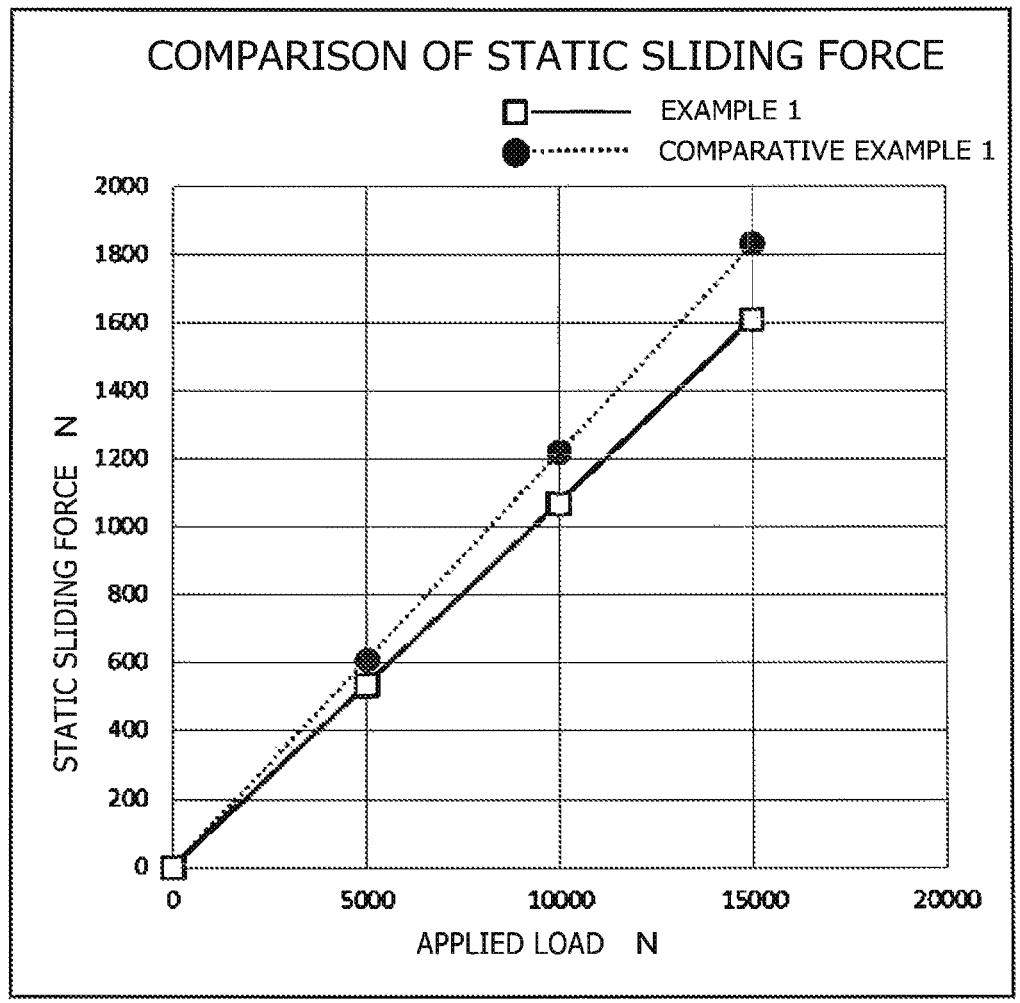
FIG. 5 is a graph illustrating variation in static sliding force relative to an applied load of each of Example 1 and Comparative Example 1.
Figure 6:
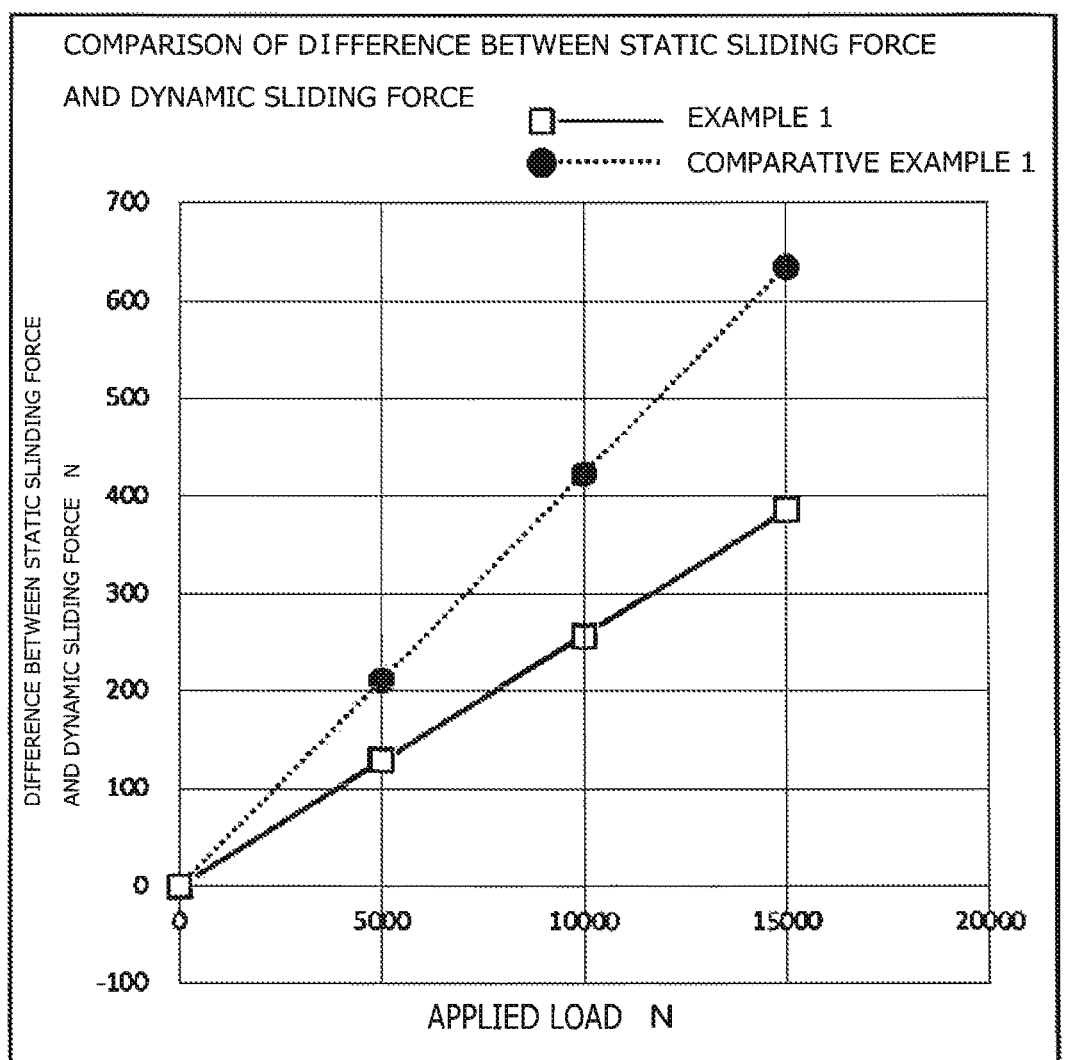
FIG. 6 is a graph illustrating variation in difference between a static sliding force and a dynamic sliding force relative to an applied load of each of Example 1 and Comparative Example 1.

Measurement results of dynamic sliding force, measurement results of static sliding force, and a difference between the static sliding force and the dynamic sliding force, are illustrated in FIGS. 4, 5, and 6, respectively.

As illustrated in FIGS. 4 and 5, the test pieces of Example 1 and the test piece of Comparative Example 1, both of which had the topcoat layer 23, exhibited no large difference in dynamic sliding force therebetween. However, forming the undercoat layer 21 decreased the static sliding force.

Moreover, as illustrated by the graph of the difference between the static sliding force and the dynamic sliding force in FIG. 6, Example 1, which was formed with the undercoat layer 21, exhibited a small gradient, and Example 1 prevented occurrence of stick-slip even when the applied load was increased.

Furthermore, static friction coefficient and dynamic friction coefficient of each of Examples 1 and 2 were measured.

The measurement results are illustrated in Table 1.

TABLE 1

| | Example 1 | Example 2 |
|---|---|---|
| Static Friction Coefficient ($\mu s$) | 0.108 | 0.130 |
| Dynamic Friction Coefficient ($\mu d$) | 0.100 | 0.090 |
| $\mu s - \mu d$ | 0.008 | 0.040 |

The result of Table 1 shows that Example 1, which had the topcoat layer 23 with the film thickness of 7 μm, had smaller static friction coefficient than Example 2, which had the topcoat layer 23 with the film thickness of 13.5 μm, and stick-slip can be prevented, because the ratio of the static sliding force and the dynamic sliding force is small.

(Durability Test)

Durability test was performed by sliding repeatedly under a fixed load of 100 N in the condition in which a reciprocation frequency of 3 Hz and an amplitude of 2.2 mm, by is using the high-speed reciprocating friction test apparatus (PLINT TE77).

Figure 7:
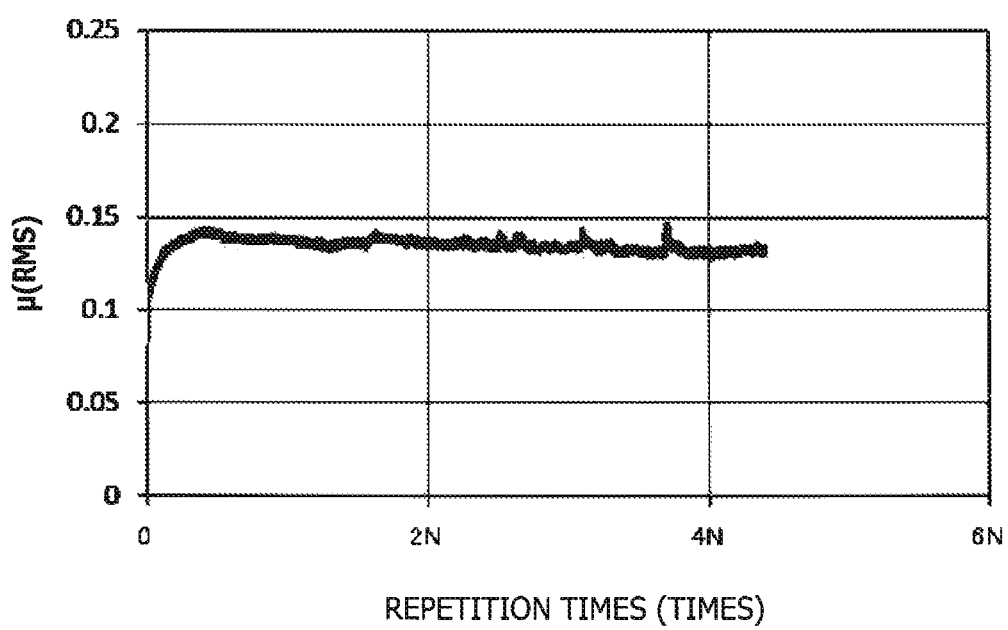
FIG. 7 is a graph illustrating variation in friction coefficient relative to repetition times (durability) of Example 1.
Figure 8:
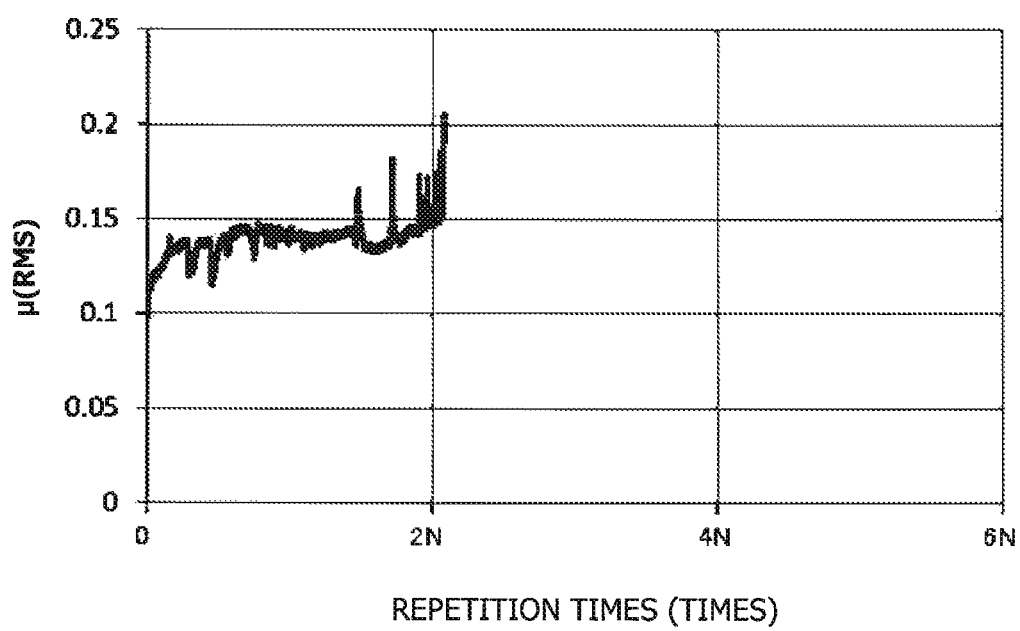
FIG. 8 is a graph illustrating variation in friction coefficient relative to repetition times (durability) of Comparative Example 1.

The test result of Example 1 is illustrated in FIG. 7, and the test result of Comparative Example 1 is illustrated in FIG. 8.

A comparison between the graph in FIG. 7 and the graph in FIG. 8 shows that Example 1, which was formed with the undercoat layer 21, exhibited a small amplitude from an initial stage of sliding and suppressed occurrence of stick-slip. In addition, the friction force did not increase although sliding was repeated for a long time, and Example 1 was superior in durability.

The reason for this is that minute deformation of the sliding surface is suppressed, the topcoat layer 23 and the intermediate layer 22 are not prone to wear, and furthermore, the undercoat layer 21 is hard such that the base metal in the base material 2 is unlikely to be exposed even when the topcoat layer 23 and the intermediate layer 22 are worn out.

Table 1 and FIG. 7 show that performing both of formation of the undercoat layer 21 and making the topcoat layer 23 have a thickness of 9 μm or less, enables suppressing stick-slip and obtaining durability at further high levels.

REFERENCE SIGNS LIST

1 Sliding spline shaft device
2 Base material
21 Undercoat layer
211 Compound layer
22 Intermediate layer
23 Topcoat layer
3 Male spline
4 Female spline

The invention claimed is:

1. A sliding spline shaft device for an automobile, the sliding spline shaft device comprising:
   a male spline; and
   a female spline that is fitted to the male spline in an axially slidable manner; wherein:
   at least one of the splines has a surface processed layer comprising an undercoat layer, an intermediate layer containing a phosphate, and a topcoat layer containing a solid lubricant and a binder resin, in this order;
   the undercoat layer comprises a diffusion layer, and a compound layer containing an iron nitride; and
   the compound layer is porous.

2. The sliding spline shaft device for an automobile according to claim 1, wherein the undercoat layer has Vickers hardness (HV) of 500 HV0.1 or greater.

3. The sliding spline shaft device for an automobile according to claim 2, wherein only the male spline comprises the undercoat layer, the male spline has a base material with a lower surface hardness than the female spline.

4. The sliding spline shaft device for an automobile according to claim 2, wherein a total average film thickness of the intermediate layer and the topcoat layer is 20 μm or less.

5. The sliding spline shaft device for an automobile according to claim 2, wherein the solid lubricant contains at least one of molybdenum disulfide particles or graphite particles, and an average film thickness of the topcoat layer is 1 μm or greater and 15 μm or less.

6. The sliding spline shaft device for an automobile according to claim 2, wherein the intermediate layer contains manganese phosphate and has a film thickness of 1 μm or greater and 5 μm or less.

7. The sliding spline shaft device for an automobile according to claim 2, wherein the compound layer has an average film thickness of 5 μm or greater and 15 μm or less.

8. The sliding spline shaft device for an automobile according to claim 2, wherein a base material of the at least one of the splines is a carbon steel that contains, at least; 0.18 mass % or greater and 0.48 mass % or less of carbon (C), 0.15 mass or greater and 0.35 mass % or less of silicon (Si), and 0.60 mass % or greater and 0.90 mass or less of manganese (Mn).

9. The sliding spline shaft device for an automobile according to claim 2, wherein only the female spline comprises the undercoat layer, and the female spline has a base material with a lower surface hardness than the male spline.

10. The sliding spline shaft device for an automobile according to claim 1, wherein only the male spline comprises the undercoat layer, the male spline has a base material with a lower surface hardness than the female spline.

11. The sliding spline shaft device for an automobile according to claim 1, wherein a total average film thickness of the intermediate layer and the topcoat layer is 20 μm or less.

12. The sliding spline shaft device for an automobile according to claim 1, wherein the solid lubricant contains at least one of molybdenum disulfide particles or graphite particles, and an average film thickness of the topcoat layer is 1 μm or greater and 15 μm or less.

13. The sliding spline shaft device for an automobile according to claim 1, wherein the intermediate layer contains manganese phosphate and has a film thickness of 1 μm or greater and 5 μm or less.

14. The sliding spline shaft device for an automobile according to claim 1, wherein the compound layer has an average film thickness of 5 μm or greater and 15 μm or less.

15. The sliding spline shaft device for an automobile according to claim 1, wherein a base material of the at least one of the splines is a carbon steel that contains, at least; 0.18 mass % or greater and 0.48 mass % or less of carbon (C), 0.15 mass or greater and 0.35 mass % or less of silicon (Si), and 0.60 mass % or greater and 0.90 mass or less of manganese (Mn).

16. The sliding spline shaft device for an automobile according to claim 1, wherein only the female spline comprises the undercoat layer, and the female spline has a base material with a lower surface hardness than the male spline.

* * * * *